US009652925B1

(12) United States Patent
Skiffington (10) Patent No.: US 9,652,925 B1
(45) Date of Patent: May 16, 2017

(54) INFECTION CONTROL SYSTEMS AND METHODS

(71) Applicant: Charm Sciences, Inc., Lawrence, MA (US)

(72) Inventor: Richard T. Skiffington, North Reading, MA (US)

(73) Assignee: Charm Sciences, Inc., Lawrence, MA (US)

( * ) Notice: Subject to any disclaimer, the term of this patent is extended or adjusted under 35 U.S.C. 154(b) by 0 days.

(21) Appl. No.: 14/277,425

(22) Filed: May 14, 2014

Related U.S. Application Data

(60) Provisional application No. 61/823,627, filed on May 15, 2013.

(51) Int. Cl.
| | | |
|---|---|---|
| *G06F 17/00* | (2006.01) |
| *G07F 11/62* | (2006.01) |
| *A47B 67/04* | (2006.01) |
| *G06Q 10/08* | (2012.01) |
| *G07F 9/02* | (2006.01) |

(52) U.S. Cl.
CPC .............. *G07F 11/62* (2013.01); *A47B 67/04* (2013.01); *G06Q 10/087* (2013.01); *G07F 9/026* (2013.01)

(58) Field of Classification Search
None
See application file for complete search history.

(56) References Cited

U.S. PATENT DOCUMENTS

| | | | | |
|---|---|---|---|---|
| 7,809,470 | B2 * | 10/2010 | Shoenfeld .............. | G08B 13/14 221/123 |
| 7,853,355 | B1 * | 12/2010 | Willemse ................ | G07F 9/026 700/232 |
| 2006/0074524 | A1 * | 4/2006 | Chirnomas .......... | B65G 57/302 700/242 |
| 2008/0021779 | A1 * | 1/2008 | Lynn .................... | G06Q 20/206 705/14.65 |
| 2009/0159608 | A1 * | 6/2009 | Shoenfeld ........... | G06F 19/3462 221/1 |

* cited by examiner

*Primary Examiner* — Prasad Gokhale
(74) *Attorney, Agent, or Firm* — MacCord Mason PLLC; Richard J. Long (57) ABSTRACT

Hygiene control stations and methods are shown and described. In one embodiment, the control station includes picking compartments with corresponding automated inventory control. Further, the control stations may include user instructions and best hygiene practices. In particular examples, the control stations include sensors and alarms to ensure proper usage. The result is control systems and methods to improve hygiene care, infection control, inventory management, and the like.

20 Claims, 8 Drawing Sheets

INFECTION CONTROL SYSTEMS AND METHODS

This application claims the benefit of U.S. provisional application No. 61/823,627, filed May 15, 2013, which is incorporated herein by reference in its entirety.

FIELD OF THE TECHNOLOGY

The present disclosure relates generally to hygiene practices, and more particularly to improved infection control station systems and methods.

BACKGROUND

Applicants desire systems and methods for hygiene practices to improve infection control and inventory management, without the drawbacks presented by the traditional systems and methods.

SUMMARY

In accordance with the present disclosure, control stations and methods are provided to ensure proper hygiene practices and inventory management. This disclosure provides improved patient room arrangements and user control stations that are convenient, efficient, and safe for the user, particularly when used in medical environments.

In one embodiment of the present disclosure, a patient infection control and inventory management arrangement includes a patient evaluation and treatment area, at least one patient bed, and a user control station typically aligned adjacent the entry and exit access. The arrangement typically includes a substantially enclosed patient evaluation and treatment area, i.e. a medical room, a patient hospital room, or the like, having at least one entry and exit access. The patient bed is typically positioned within the treatment area. The control station typically includes a supply inventory management system, a user interface, and an automated activation system. Typically, the supply inventory management system has a plurality of picking compartments housing infection control inventory and a counter in communication with the picking compartments to detect and monitor usage of the inventory. The control station, including the user interface, typically identifies a user and automatically coordinates best hygiene practice steps based on the user identification. The automated activation system typically activates the station to allow access to the picking compartments and to generate the best hygiene practice steps when the identified user enters a predetermined proximity of the control station.

In particular examples, the patient infection control and inventory management arrangement includes a user alignment floor mat. In some examples, the user alignment floor mat may be spaced from the user interface, or the like, to properly align the user for full view and/or function with the control station.

In another embodiment, a user control station positioned in a patient infection control room includes a user interface, an automated activation system, and a sterilizer system. The user interface typically identifies a user and generates best hygiene practice instructional steps, for instance to operate the user station based on the user identification. The automated activation system typically activates the station to generate the instructional steps when a user enters a predetermined proximity of the station. The sterilizer system typically includes an ultraviolet radiation source that is generally aligned, for instance in an illumination path or the like, with a sterilizing bay, or similar area, to sanitize a user's personal device or the like.

In some examples, the user interface includes a telescoping connection to rotate and pivot the user interface about the control station. The user interface may include a touch-screen monitor having a staff entry portal and a visitor entry portal, for instance the staff entry portal may allow a predetermined access within the user station and the visitor entry portal may allow limited predetermined access within the control station. The user interface may include a staff best-hygiene practices instructional video and a visitor best-hygiene practices instructional video. The automated activation system may include a triggering device, for instance a sensor curtain, a camera, a motion sensor, an RFID recognition sensor, a combination thereof, and the like. The sterilizer system may include an ultraviolet waste container sanitizer. The control station may be repositionable around the infection control room.

In yet another embodiment, a user control station positioned in a patient infection control room may include a plurality of picking compartments, a plurality of inventory replacement slots, an automated activation system, and a counter system. Typically, the plurality of picking compartments have a body to generally house infection control inventory, and the like, and a picking opening to expose the infection control inventory, and the like. The plurality of inventory replacement slots are typically positioned adjacent to the picking compartments and to access to the picking compartments for replacing the inventory. The automated activation system typically activates the station to allow access to the picking compartments, for instance when a user enters a predetermined proximity of the control station. The counter is typically in communication with the picking compartments and detects and monitors usage of the inventory, i.e. the counter may deduct supplies used from an inventory listing or similar database in communication with the control station.

In some examples, the automated activation system includes a triggering device, for instance a sensor curtain, a camera, a motion sensor, a radio frequency identification (RFID) sensor, a combination thereof, and the like. The picking compartments may include gown picking compartment, a plurality of safety glove sizes picking compartments, a face mask picking compartment, a combination thereof, and the like. The safety glove picking compartments may include a large glove picking compartment, a medium glove picking compartment, a small glove picking compartment, a combination thereof, and the like.

The counter may count a used gown, a used glove, a used face mask, a combination thereof, and the like. The counter may include a low level alert to indicate a low inventory based on deductions of supplies used from the inventory listing/database. For instance, the low level alert may be an electronic message delivered to a remote device or the like.

In particular examples, the lower portion may have a plurality of supply compartments that are generally positioned below the picking compartments. For instance, the supply compartments may include a first compartment to store gloves, masks and gown supplies; a second compartment to store soap, sanitizer, and paper towels; and a third compartment to store miscellaneous supplies. The control station may include a keyless autolocking system to lock any of the picking compartments and the like. Further, the control station may be repositionable around the infection control room.

One aspect of the present disclosure is to provide a medical patient room with improved hygiene control for staff and visitors. In some examples, the room includes control stations having auto-inventoried picking compartments. In other examples, the control stations include sanitizing components to sanitize a variety of user, i.e. visitor and staff, materials.

Another aspect of the disclosure is to provide a control station with secured refill storage. In particular examples, the control stations include automated sensing systems and user interface instructions.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
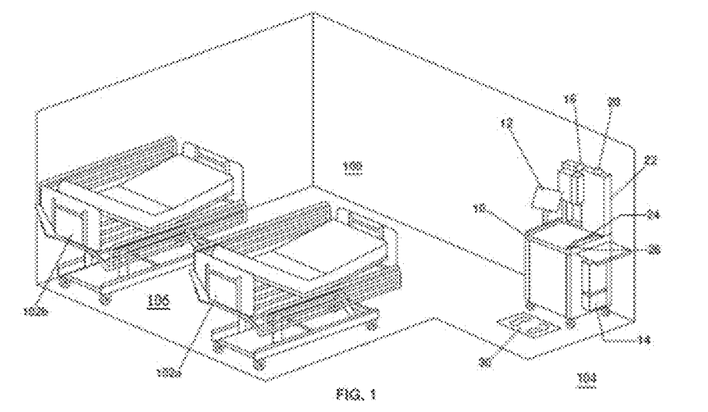
FIG. 1 is a schematic view of a medical patient room with a control station according to an embodiment of the disclosure.
Figure 2:
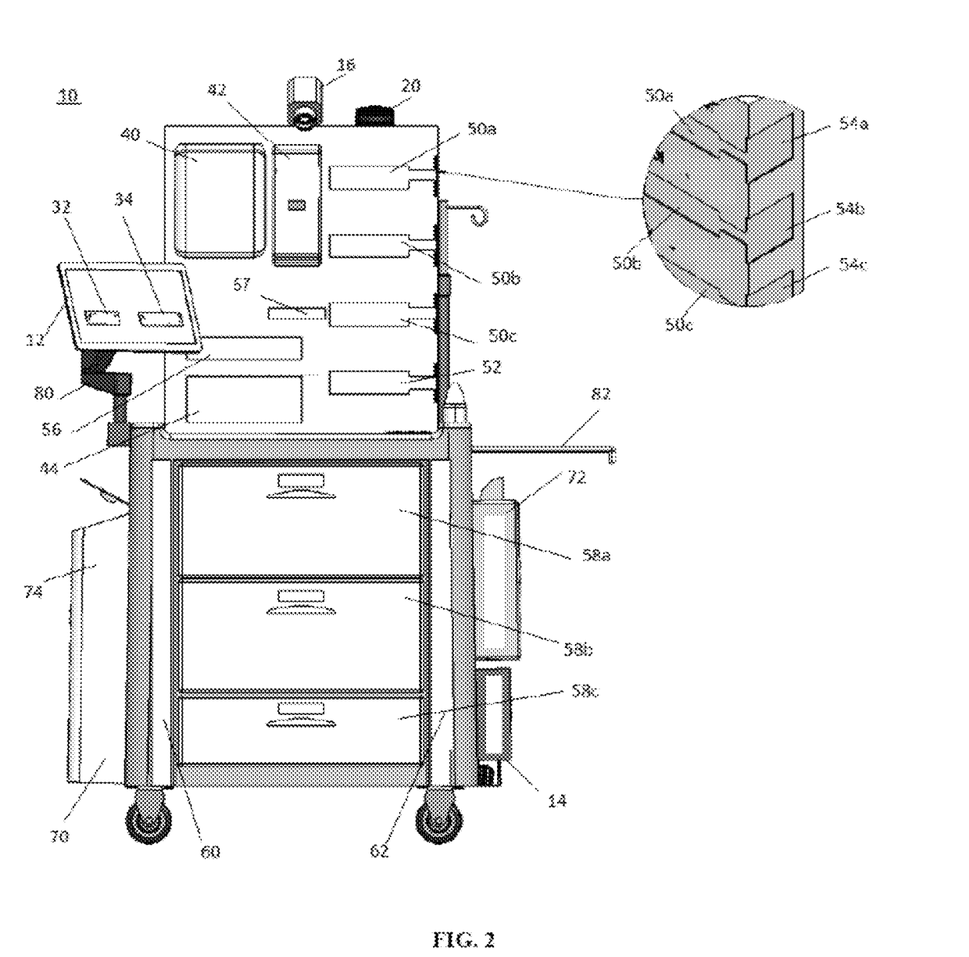
FIG. 2 is a front view of a control station according to one embodiment of the present disclosure.

Referring now to the drawings in general and FIG. 1 in particular, it will be understood that the illustrations are for the purpose of describing embodiments of the disclosure and are not intended to limit the disclosure or any invention thereto. As best seen in FIGS. 1 and 2, an improved infection control room 100 and user station 10 are shown embodied according to the present disclosure. User station 10 may include picking compartments, sanitizing components, refill storage, inventory management and automated sensing systems.

As shown in FIG. 1, an improved hygiene-practices room 100, for instance a medical patient room or the like, may include a control station 10. The room 100 may include one or more medical beds 102a,102b, medical equipment and other furniture pieces. Those of ordinary skill in the art having the benefit of this disclosure will recognize that a variety of room configurations may include two or more control stations 10 at particular entry/exit access 104 locations within patient evaluation and treatment area 106 according to the size and scope of the facility. Typically, control station 10 includes a user interface 12, a controller box 14, an tpper picking shelf and a lower storage shelf, and motion sensing capability. As further shown in FIG. 1, a mat 30 may be aligned with any of the motion sensing capabilities shown and described herein. In particular examples, the mat 30 is a positioning sticky pad mat.

FIG. 1 illustrates one embodiment of the user interface screen 12. In particular examples, the user screen 12 includes multi-language, international symbols and the like. Typically, the user screen 12 plays an instructional video of best hygiene practices as shown and described herein. In particular examples, the user screen 12 has WIFI connectivity or the like.

The control station 10 may include a security activation camera 16. As shown in FIG. 1, the camera 16 may be positioned on the upper portion of the station, however, other examples include camera placements at various locations, as well as incorporating two or more cameras into the system. In particular examples, the camera may be motion activated, via a motion sensor the like. In other examples, the camera may be activated with a RFID, or similar, sensor. The control station may further include an alarm system 20, for instance a strobe beacon, mini horns or the like. The control station may further include an I.V. pole 22, garment hanger or similar device.

Typically, the control station 10 is repositionable about infection control room 100 and/or moveable to various locations. As shown in FIG. 1, the control station 10 may include wheels, or the like, and a handle 24 for transporting the unit. Other examples include a variety of control station shapes, styles, and sizes for the convenience of its user.

Turning now to FIG. 2, one example of a control station 10 is shown having a plurality of picking compartments, sanitizing components, refill storage, inventory controls and automated systems.

As shown, the control station 10 may include a paper towel dispenser 40 and a disinfectant/soap dispenser 42. In some examples, the paper town dispenser 40 and/or disinfectant/soap dispenser 42 maybe touchless. The control station may further include a gown picking compartment 56 and face mask picking compartment 52. A variety of gloves sizes may be supplied from the control station picking compartments. For instance, the control station may include a large glove picking compartment 50a, medium glove picking compartment 50b, and a small glove picking compartment 50c. In some examples, each of the glove picking compartments, and other compartments shown and described herein, may include slots 54a,54b,54c for replacing the inventory in the corresponding compartments. In addition, the lower portion of the control station may include a variety of supplies, for instance refill supplies for the upper portion compartments. As shown in FIG. 2, the station may include a first compartment 58a for gloves, masks and gown supplies; a second compartment 58b for soap/sanitizer and paper towel supplies; and a third compartment 58c for miscellaneous supplies. In some examples, a slide-out surface 82 may be removable from the station to support additional user materials. Those of ordinary skill in the art having the benefit of this disclosure will recognize a variety of additional storage compartments and compartment configurations. Further, in other examples, the picking and storage compartments may be reversed or aligned on opposing sides of one another.

FIG. 2 further shows the control station may include a variety of sterilizer systems for sterilizing user materials and/or waste. As shown, the control station may include a device sanitizer 44. The device sanitizer 44 may be used to sanitize cell phones, PDAs and the like using UV sterilization. Further, the control station may include a waste container 70 with a UV sanitizer system 74. Those of ordinary skill in the art having the benefit of this disclosure will recognize a variety of sterilization methods may be incorporated without departing from the spirit of the inventions. In yet other examples, the station may include a sharp disposal 72.

In addition, FIG. 2 illustrates the control station typically includes automated systems for activation, supply inventory management, instructions for best hygiene practices and exiting sensing. In particular examples, the control station includes a camera 16 that may be motion-activated or activated via a RFID sensor. An activation sensor curtain 62 may be aligned on the station to activate the system when a user enters the proximity of the station, i.e. movement triggered or the like. Similarly, an exiting sensor curtain 62 may be aligned on the station to activate the system when a user approaches the proximity of the station. In addition, the control station may include a counter 57 to detect usage of any of the materials shown and described herein. For instance, the counter may deduct supplies used from the inventory. In particular examples, a room entry detection system may count used garments, gloves and other materials. In further examples, a low level alert will automatically be sent via text or email following the inventory process. The control station may further include a keyless autolocking of any of the storage compartments shown and described herein.

FIG. 2 shows one example of a user interface 12. As shown, the user interface 12 is supported with an adjustable, including telescoping, connection 80 to rotate, pivot or otherwise adjust the user interface in a variety of orientations. Any number of monitor interface configurations and capabilities may be incorporated into any of the embodiments shown and described herein. As shown in FIG. 2, the user interface 12 may be a touch-screen monitor. In this example, the user interface 12 includes a staff entry portal 32 and a visitor entry portal 34. Examples having the distinct visitor and staff portals will enable the station to provide specific hygiene monitoring materials and instructions for the intended user.

Each control station typically includes an electrical controller box 14. In some examples, the controller box 14 has WIFI capability, for instance to correspond, via email, text or the like, alarm alerts. In other examples, the controller box 14 includes a UPS system for camera and WIFI backup. Those of ordinary skill in the art having the benefit of this disclosure will recognize the control box may include a variety of additional electrical components and connections.

Figure 3:
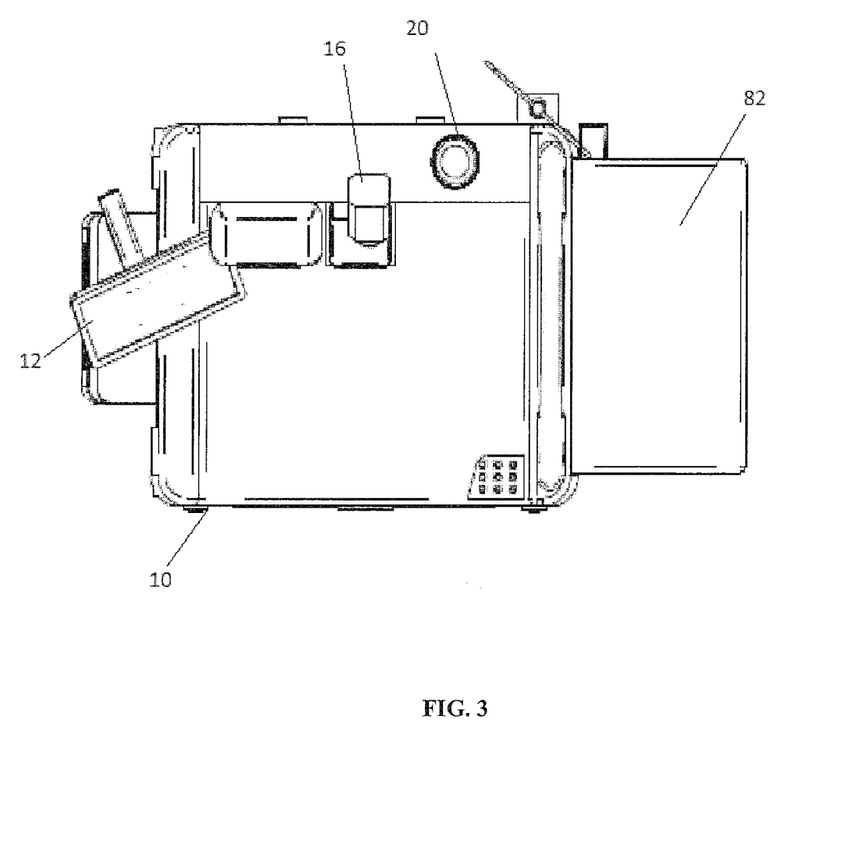
FIG. 3 is a top view of a control station according to the example shown in FIG. 2.
Figure 4:
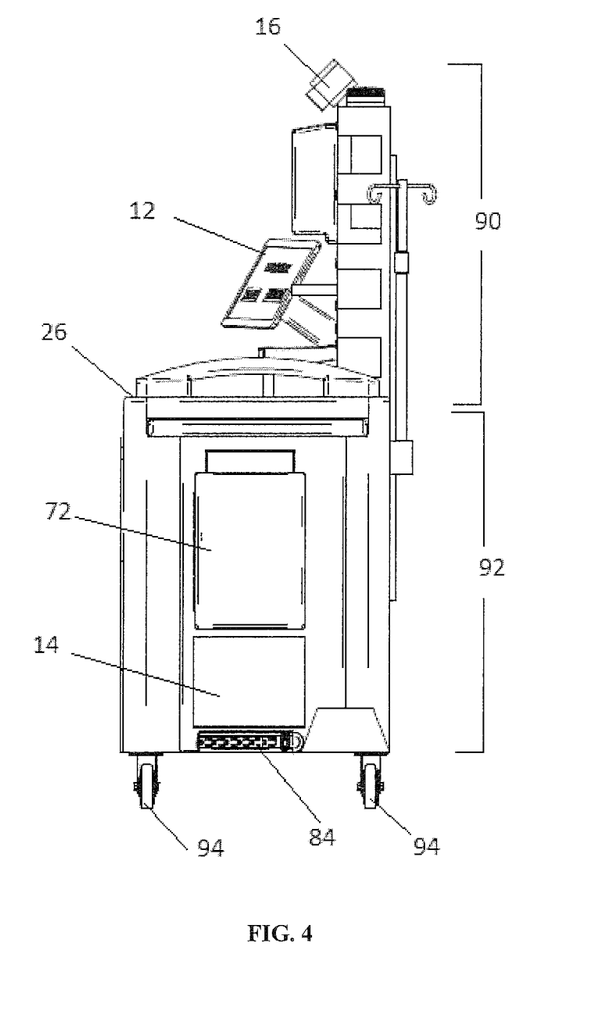
FIG. 4 is a side view of a control station according to the example shown in FIG. 2.
Figure 5:
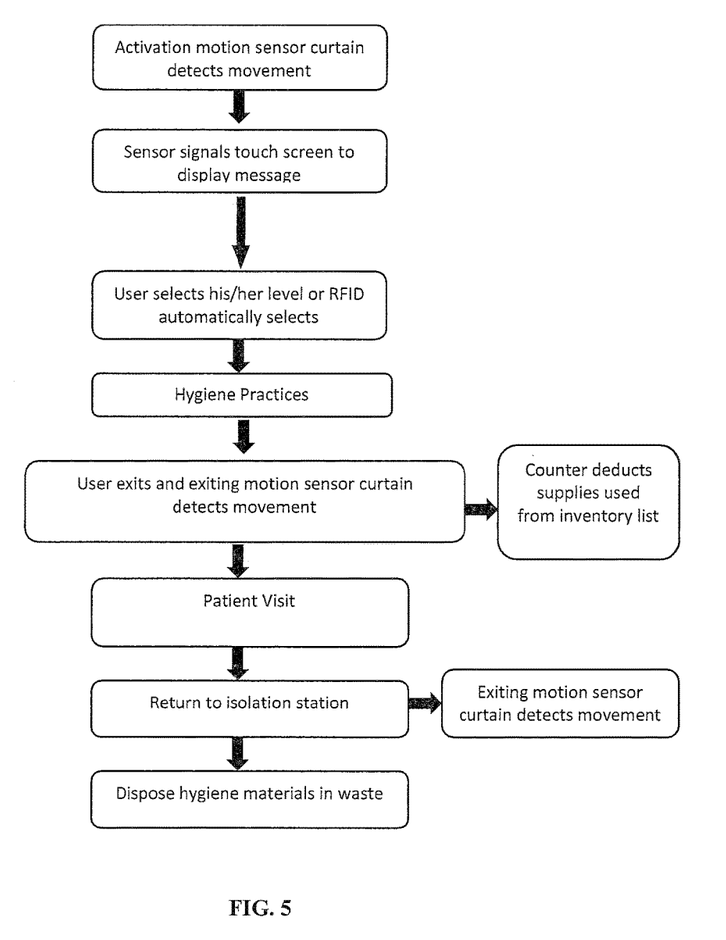
FIG. 5 is a flowchart of a hygiene control method according to one embodiment of the disclosure.
Figure 6:
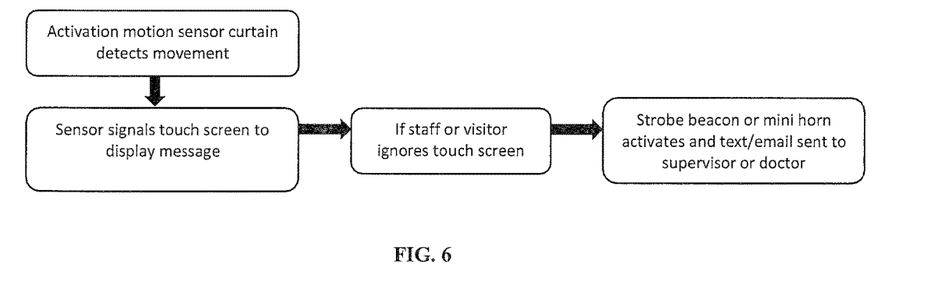
FIG. 6 is a flowchart of additional steps in a hygiene control method according to one embodiment of the disclosure.
Figure 7:
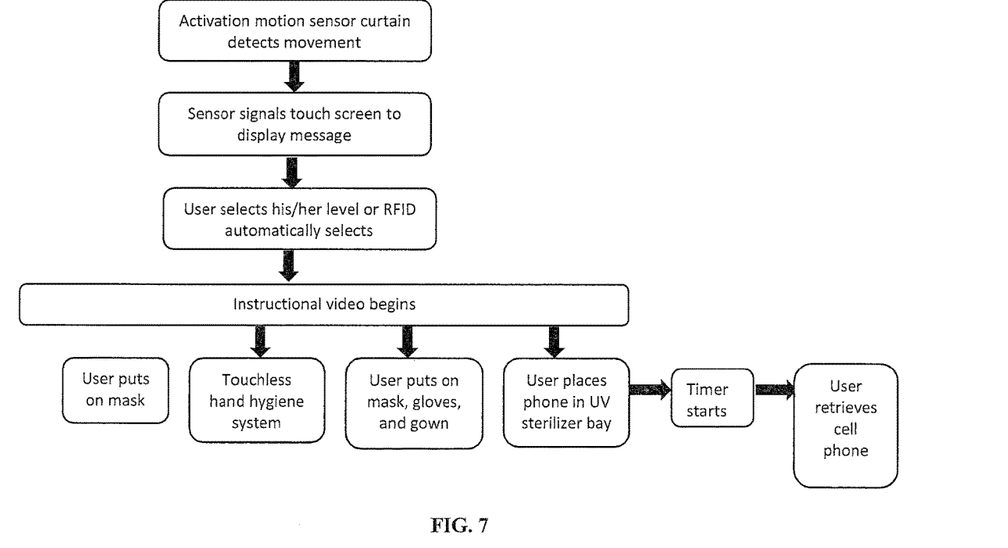
FIG. 7 is a flowchart of further steps in a hygiene control method according to one embodiment of the disclosure.
Figure 8:
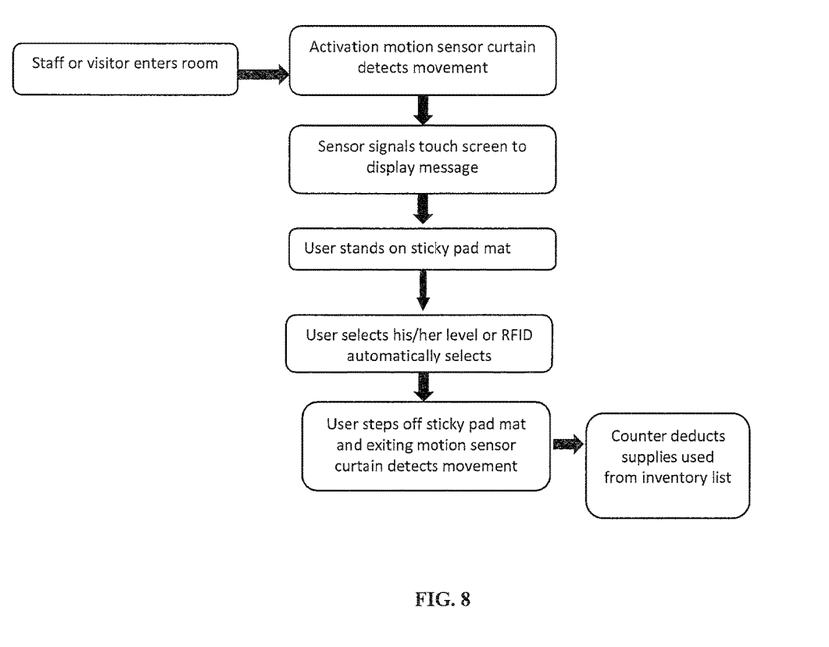
FIG. 8 is a flowchart of yet additional steps in a hygiene control method according to one embodiment of the disclosure.
Figure 9:
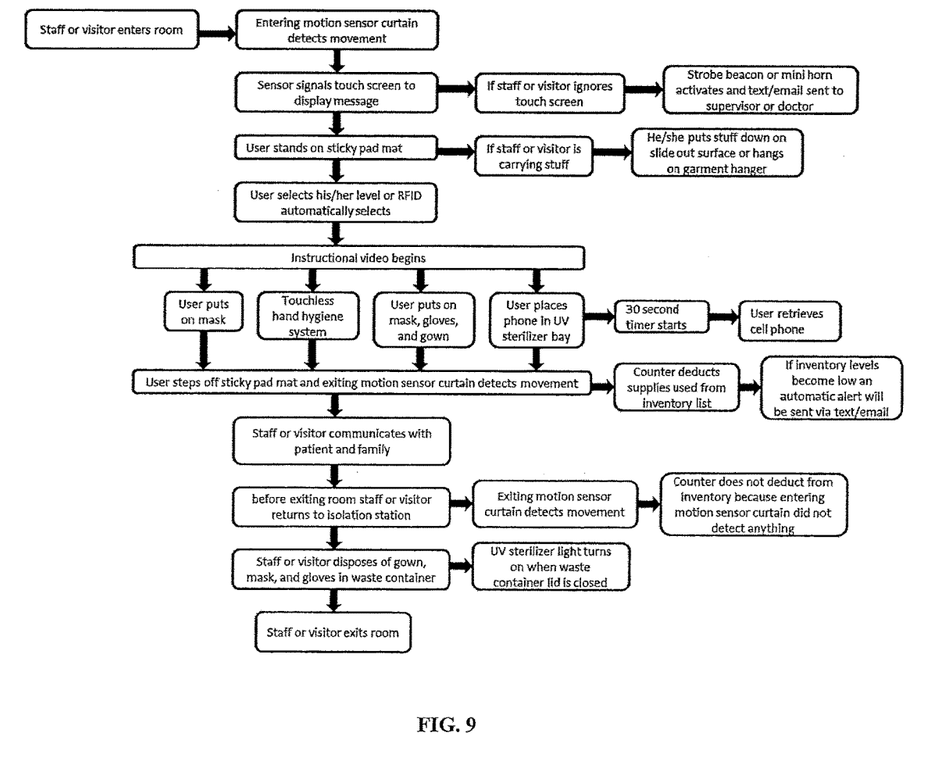
FIG. 9 is another flowchart of a hygiene control method according to the present disclosure.

FIGS. 3 and 4 illustrate features of the control station. FIG. 3 shows the user interface 12, camera 16, alarm 20 and slide out surface 82. FIG. 4 shows the side perspective elements of the upper section 90 and lower section 92. Again, other embodiments reverse any of the upper section and lower section elements shown and described herein. Typically, the station is mobile and includes wheels 94 or the like to easily reposition the station around the room or at alternative locations. Other examples include fixed stations in a permanent or semi-permanent position. As further shown in FIG. 4, the controller box 14 may include outlet strip 84 or the like.

In other embodiments, the disclosure includes a control station kit. The kit may provide hygiene control picking compartments, sanitizing components, refill storage, inventory controls and automated systems as shown and described herein. The kit may comprise picking and storage compartments, e.g. any of the compartments previously shown or described. Further, the kit may comprise a user interface, e.g. any of the user monitors previously shown or described. In addition, the kit may comprise an inventory and/or sensing system, e.g. any of the motion sensing and inventory elements previously shown or described.

FIGS. 5-9 illustrate particular examples of hygiene control station methods and best practices.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A control station positioned in a patient infection control room, said control station comprising:
   a. a plurality of picking compartments to house infection control inventory and expose said infection control inventory;
   b. a plurality of inventory replacement slots adjacent to said picking compartments and adapted to allow access to said picking compartments from a secured position for replacing said inventory;
   c. an automated activation system to activate said station to allow access to said picking compartments when a user enters a predetermined proximity of said station;
   d. a counter in communication with said picking compartments and adapted to detect and monitor usage of said inventory; and
   e. a user interface to identify a user and to generate best hygiene practice instructional steps to operate said control station based on said user identification.

2. The device of claim 1, wherein said automated activation system includes a triggering device selected from the group consisting of a motion sensor curtain, a camera, a motion sensor, and a radio frequency identification (RFID) sensor.

3. The device of claim 1, wherein said picking compartments are chosen from a compartment selected from the group consisting of a gown picking compartment, a plurality of safety glove sizes picking compartments, and a face mask picking compartment.

4. The device of claim 3, wherein said safety glove picking compartments include a large glove picking compartment, a medium glove picking compartment, and a small glove picking compartment.

5. The device of claim 3, wherein said counter deducts a used gown, a used glove, or a used face mask from an inventory listing.

6. The device of claim 1, wherein said counter includes a low level alert to indicate a low inventory.

7. The device of claim 6, wherein said low level alert is an electronic message delivered to a remote device.

8. The device of claim 1, including a lower portion having a plurality of supply compartments positioned below said picking compartments.

9. The device of claim 8, wherein said supply compartments are chosen from a first compartment adapted to store gloves, masks and gown supplies; a second compartment adapted to store soap, sanitizer, and paper towels; and a third compartment adapted to store miscellaneous supplies.

10. The device of claim 1, including a keyless autolocking system of said plurality of picking compartments.

11. The device of claim 1, wherein said control station is repositionable around said infection control room.

12. A control station positioned in a patient infection control room, said control station comprising:
   a. a user interface to identify a user and to generate best hygiene practice instructional steps to operate said user station based on said user identification;
   b. an automated activation system to activate said station to generate said instructional steps when said user enters a predetermined proximity of said station; and
   c. a sterilizer system having an ultraviolet source aligned with a sterilizing bay to sanitize a user's personal device.

13. The device of claim 12, wherein said user interface includes a telescoping connection adapted to rotate and pivot said user interface about said control station.

14. The device of claim 12, wherein said user interface includes a touch-screen monitor having a staff entry portal and a visitor entry portal, wherein said staff entry portal allows a predetermined access within said user station and said visitor entry portal limits said predetermined access within said user station.

15. The device of claim 14, wherein said user interface include a staff best-hygiene practices instructional video and a visitor best-hygiene practices instructional video.

16. The device of claim 12, wherein said automated activation system includes a triggering device selected from the group consisting of a motion sensor curtain, a camera, a motion sensor, an RFID recognition sensor.

17. The device of claim 12, wherein said sterilizer system includes an ultraviolet waste container sanitizer.

18. The device of claim 12, wherein said control station is repositionable around said infection control room.

19. A patient infection control and inventory management arrangement comprising:
   a. a substantially enclosed patient evaluation and treatment area having at least one entry and exit access;
   b. a patient bed positioned within a patient evaluation and treatment area; and
   c. a control station positioned within said treatment area and comprising:
      i. a supply inventory management system having a plurality of picking compartments housing infection control inventory and a counter in communication with said picking compartments to detect and monitor usage of said inventory;
      ii. a user interface adapted to identify a user and automatically coordinate best hygiene practice steps based on said user identification; and
      iii. an automated activation system to activate said station to allow access to said picking compartments from a secured position and to generate said best hygiene practice steps when said user enters a predetermined proximity of said station,
   wherein said user station being aligned adjacent said entry and exit access.

20. The arrangement of claim 19, including a user alignment floor mat spaced from said user interface and adapted to align said user with said control station.

* * * * *